United States Patent
Bian et al.

(10) Patent No.: US 9,681,604 B2
(45) Date of Patent: Jun. 20, 2017

(54) OPERATING CONTROL MECHANISM FOR GARDEN TOOL

(71) Applicant: SUZHOU CLEVA ELECTRIC APPLIANCE CO., LTD., Suzhou (CN)

(72) Inventors: Xiaoxian Bian, Suzhou (CN); Juan Wei, Suzhou (CN); Juan Gu, Suzhou (CN); Yongping Sun, Suzhou (CN)

(73) Assignee: SUZHOU CLEVA ELECTRIC APPLIANCE CO., LTD., Suzhou (CN)

( * ) Notice: Subject to any disclaimer, the term of this patent is extended or adjusted under 35 U.S.C. 154(b) by 56 days.

(21) Appl. No.: 14/804,517

(22) Filed: Jul. 21, 2015

(65) Prior Publication Data

US 2016/0037719 A1  Feb. 11, 2016

Related U.S. Application Data

(63) Continuation of application No. PCT/CN2014/070900, filed on Jan. 20, 2014.

(30) Foreign Application Priority Data

Jan. 25, 2013 (CN) .......................... 2013 1 0028408

(51) Int. Cl.
*A01D 69/00* (2006.01)
*A01D 34/82* (2006.01)
*A01D 34/67* (2006.01)
*A01D 69/02* (2006.01)

(52) U.S. Cl.
CPC .......... *A01D 34/824* (2013.01); *A01D 34/67* (2013.01); *A01D 69/02* (2013.01)

(58) Field of Classification Search
CPC .......... A01D 2034/6843; A01D 34/824; B25F 5/026
USPC ............................................. 56/10.8
See application file for complete search history.

(56) References Cited

U.S. PATENT DOCUMENTS

| | | | | |
|---|---|---|---|---|
| 2,868,034 A * | 1/1959 | Cole | ............... | A01D 34/62 56/10.8 |
| 4,885,903 A * | 12/1989 | Scag | ............... | A01D 34/6806 56/10.8 |
| 4,967,543 A * | 11/1990 | Scag | ............... | A01D 34/69 56/10.8 |
| 5,725,422 A * | 3/1998 | Leweck | ............... | B24B 23/005 16/426 |
| 5,915,487 A * | 6/1999 | Splittstoesser | ......... | B62D 51/04 180/19.1 |
| 6,581,246 B1 * | 6/2003 | Polette | ............... | A01D 34/90 16/426 |
| 7,364,169 B2 * | 4/2008 | Velke | ............... | A01D 34/82 280/32.7 |

(Continued)

FOREIGN PATENT DOCUMENTS

| | | | | |
|---|---|---|---|---|
| CN | 203120456 U | * | 8/2013 | ........... A01D 34/00 |
| EP | 1198980 A1 | * | 4/2002 | ........ A01D 34/6806 |
| GB | 2445928 A | * | 7/2008 | ........... B25G 1/04 |

*Primary Examiner* — Árpád Fábián-Kovács
(74) *Attorney, Agent, or Firm* — Perkins Coie LLP (57) ABSTRACT

An operating control mechanism for a garden tool comprises a control button and a pair of handles located at both sides of the control button. Triggers are arranged on the handles. The operating control mechanism further comprises stop components which are movable relative to the handles. The handles can rotate around axes by moving the stop components.

13 Claims, 11 Drawing Sheets

(56) References Cited

U.S. PATENT DOCUMENTS

| | | | | |
|---|---|---|---|---|
| 7,430,847 B2 * | 10/2008 | Hoffman | | A01D 34/69 |
| | | | | 180/19.3 |
| 7,458,432 B2 * | 12/2008 | Mayer | | A01D 34/68 |
| | | | | 180/6.32 |
| 7,496,990 B2 * | 3/2009 | Qiao | | A01D 34/824 |
| | | | | 16/437 |
| D610,167 S * | 2/2010 | Martin | | D15/14 |
| 7,707,684 B2 * | 5/2010 | Hittmann | | B25F 5/026 |
| | | | | 15/405 |
| 7,721,391 B2 * | 5/2010 | Bukovitz | | B25G 3/14 |
| | | | | 15/145 |
| 8,490,373 B2 * | 7/2013 | Hachisuka | | A01D 34/824 |
| | | | | 180/19.3 |
| 9,119,345 B2 * | 9/2015 | Ran | | A01D 34/84 |
| 2002/0164196 A1 * | 11/2002 | Huang | | A01B 1/222 |
| | | | | 403/52 |
| 2003/0000190 A1 * | 1/2003 | Busboom | | A01D 34/6806 |
| | | | | 56/10.8 |
| 2003/0000192 A1 * | 1/2003 | Busboom | | A01D 34/6806 |
| | | | | 56/10.8 |
| 2004/0079538 A1 * | 4/2004 | Zerrer | | A01B 33/027 |
| | | | | 172/42 |
| 2008/0282555 A1 * | 11/2008 | Lin | | A01G 3/053 |
| | | | | 30/277.4 |
| 2009/0183591 A1 * | 7/2009 | Jesse | | B25G 1/102 |
| | | | | 74/551.9 |
| 2009/0255695 A1 * | 10/2009 | Breneman | | A01G 3/062 |
| | | | | 172/15 |
| 2011/0173820 A1 * | 7/2011 | Pelleng | | A01G 3/0255 |
| | | | | 30/381 |
| 2015/0211627 A1 * | 7/2015 | Kaskawitz | | F16H 59/0278 |
| | | | | 74/473.3 |
| 2016/0000007 A1 * | 1/2016 | Bian | | A01D 34/824 |
| | | | | 280/47.371 |

* cited by examiner

OPERATING CONTROL MECHANISM FOR GARDEN TOOL

CROSS REFERENCE TO RELATED APPLICATIONS

This application is a continuation of PCT/CN2014/070900 filed 2014 Jan. 20, which claims priority to CN20130028408.5 filed 2013 Jan. 25, both of which are incorporated herein by reference.

TECHNICAL FIELD

The present invention relates to an operating control mechanism for a garden tool.

BACKGROUND ART

With the development in garden industry, garden tools such as lawn mowers, grass raking machines and scarifiers are more and more widely used. The garden tools generally comprise a machine body and an operating control mechanism, wherein the machine body is used for working on a garden or a landscape, and the operating control mechanism is used for activating and driving the machine.

The position of the operating control mechanism in the prior art is generally fixed, which fails to satisfy different demands of different users with different operation habits and different heights; moreover, in long-term use, such a stationary operating control mechanism is likely to cause working fatigue of the user; therefore, the design is less humanized.

CONTENTS OF THE INVENTION

An object of the present invention is to overcome the weaknesses in the prior art by providing an improved operating control mechanism for a garden tool, which has a more humanized design so as to satisfy different operational demands of different users.

In order to achieve the above-mentioned object, the present invention adopts a primary technical solution as follows: an operating control mechanism for a garden tool, comprising a control button and a pair of handles located at two sides of the control button, and the handles of the pairs being each provided with a trigger, characterized in that the operating control mechanism further comprises stop components which are movable relative to the handles, and the handles can rotate around axes thereof upon movement of the stop components.

In addition, the present invention further provides secondary technical solutions as follows:

The stop components are movable upwards or downwards relative to the handles and are each provided with a first toothed part, the handles are each provided with a second toothed part, and the first toothed part is engagable with the second toothed part.

The garden tool comprises a housing, wherein the housing is provided with positioning columns, and the stop components are arranged between the positioning columns and the handles.

The operating control mechanism for the garden tool further comprises elastic elements which are mounted on the positioning columns.

The operating control mechanism for the garden tool further comprises elastic elements which are mounted between the handles and the stop components.

The operating control mechanism for the garden tool further comprises casing tubes which are arranged between the stop components and the handles, each of the stop components is provided with a first toothed part, each of the casing tubes is provided with a second toothed part, and the first toothed part is engagable with the second toothed part.

The operating control mechanism for the garden tool further comprises buttons, and the buttons are mounted on the handles and are engagable with the stop components.

The stop components are movable upwards or downwards relative to the handles and are each provided with a first toothed part; the garden tool comprises a housing, the housing is provided with positioning columns, and each of the positioning columns is provided with a second toothed part; and the first toothed part is engagable with the second toothed part.

The operating control mechanism for the garden tool further comprises elastic elements which are mounted between the handles and the stop components.

The garden tool comprises a housing, and the pair of handles can form a closed area with the housing.

The handles can rotate around an axis thereof in a range of 360 degrees.

Each of the handles of the pair can rotate around the axis.

The garden tool is an electric lawn mower.

Compared with the prior art, the present invention has the advantages that providing the operating control mechanism for a garden tool with handles which can rotate in a range of 360 degrees satisfies different operation demands of different users with different operation habits and different heights, and offers a more humanized design; moreover, the structure is simple and reliable.

SPECIFIC EMBODIMENTS

A non-limiting detailed description of technical solutions of the present invention is further provided below in connection with several preferred embodiments and the accompanying drawings.

Embodiment I

Figure 1:
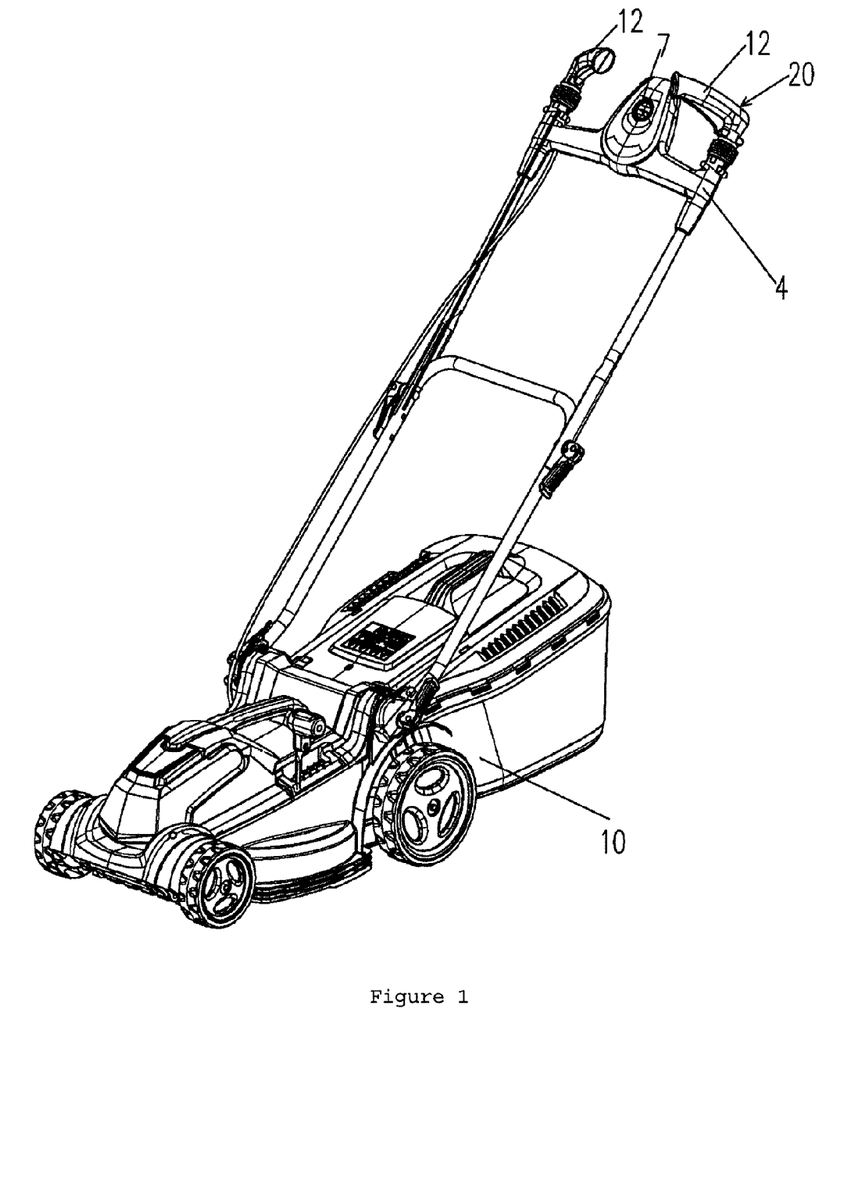
FIG. 1 is a three-dimensional schematic diagram of a garden tool of a first preferred embodiment of the present invention.
Figure 2:
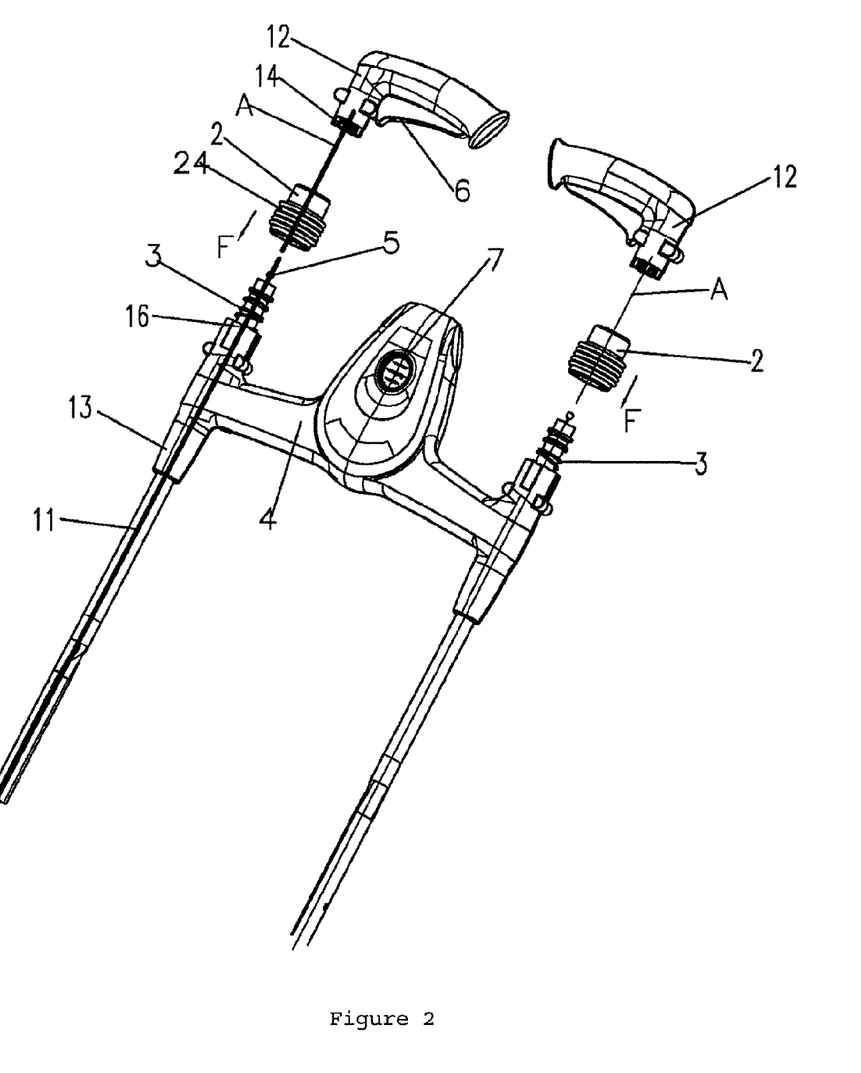
FIG. 2 is a three-dimensional exploded view of an operating control mechanism from FIG. 1.
Figure 3:
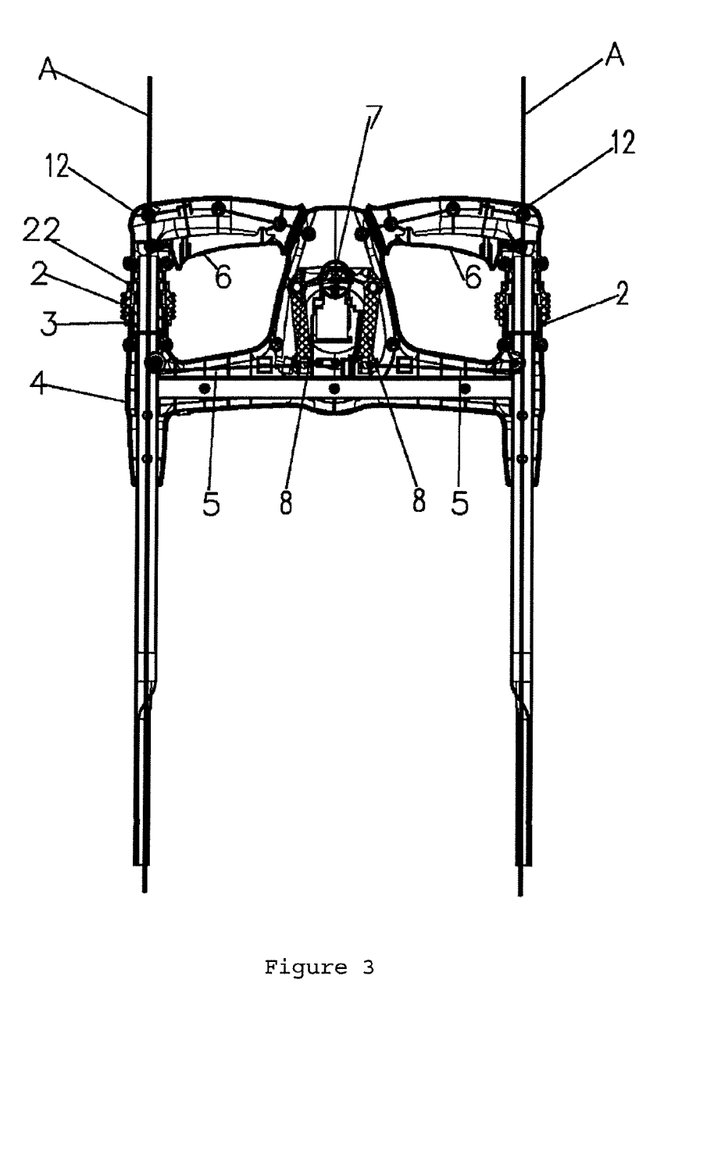
FIG. 3 is a sectional view of FIG. 2 in an assembled state.

Referring to FIGS. 1 to 3, a garden tool according to a preferred embodiment of the present invention is an electrical lawn mower, comprising a machine body part 10 for performing cutting work and an operating control mechanism 20 mounted on the machine body part 10.

The operating control mechanism 20 comprises a control button 7 and a pair of handles 12 which are arranged on two sides of the control button 7. The handles 12 of the pair are each provided with a trigger 6, and the machine can be activated by pulling a single trigger 6; the pair of handles 12 can also form a closed area with the machine body, thereby facilitating the operation. Pull ropes 5 and driving levers 8 are arranged inside a housing 4 of the operating control mechanism 20, and when the machine is to be activated, the control button 7 is pressed down and either of the triggers 6 is closed, so that the driving levers 8 are pulled by the pull ropes 5, and thus a switch is triggered.

The operating control mechanism 20 further comprises stop components 2 and elastic elements 3, which are movable relative to the handles 12. The stop components 2 are movable downwards relative to the handles 12, and each is a hollow cylinder and provided with an operable part 24 on an outer surface thereof. An inner surface of the stop component 2 is provided with a first toothed part 22, an outer surface of each of the handles 12 is provided with a second toothed part 14, and the first toothed part 22 is engagable with the second toothed part 14 so as to limit and secure the stop component 2. The housing 4 is provided with positioning columns 16, and the stop component 2 is arranged between the positioning column 16 and the handle 12. Said elastic element 3 is sheathed on the positioning column 16 and is arranged inside the stop component 2.

Figure 4:
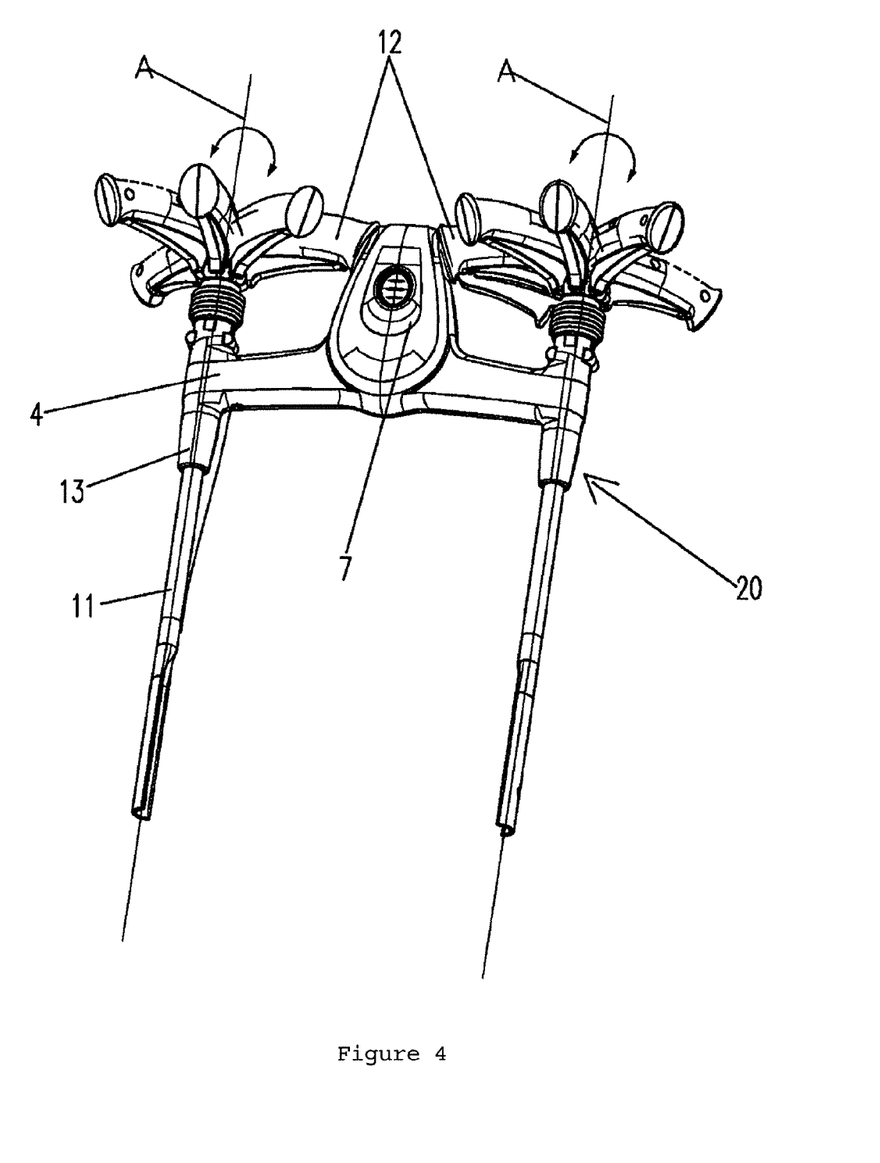
FIG. 4 is a three-dimensional schematic diagram of handles of the operating control mechanism, which handles are in different rotated positions.

In this way, when a user needs to rotate a handle 12, he presses downwards the operable part 22 of the stop component 2, as shown by the arrow F, so that the engagement between the first toothed part 22 of the stop component 2 and the second toothed part 14 of the handle 12 is released and thus the handle 12 can rotate around the longitudinal axis A thereof in a range of 360 degrees, as shown in FIG. 4.

When the handle 12 is rotated to an appropriate position, the operable part 24 of the stop component 2 is released, so that the stop component 2 bounces upwards under a restoring force of the elastic element 3 to be engaged with the handle 12, thus limiting and securing the handle 12 again, in which case, the handle 12 can reach a position which is suitable for operation by the user.

In addition, the operating control mechanism 20 further comprises two steel tubes 11 which are connected to two sides of the machine body part 10. Each steel tube 11 is provided with a rotary mechanism 13 which can rotate around an axis thereof (not shown in the figures). The steel tube 11 runs through the positioning column 16 and the stop component 2, so that the rigidness and strength of the connection therebetween are enhanced.

Embodiment II

Figure 5:
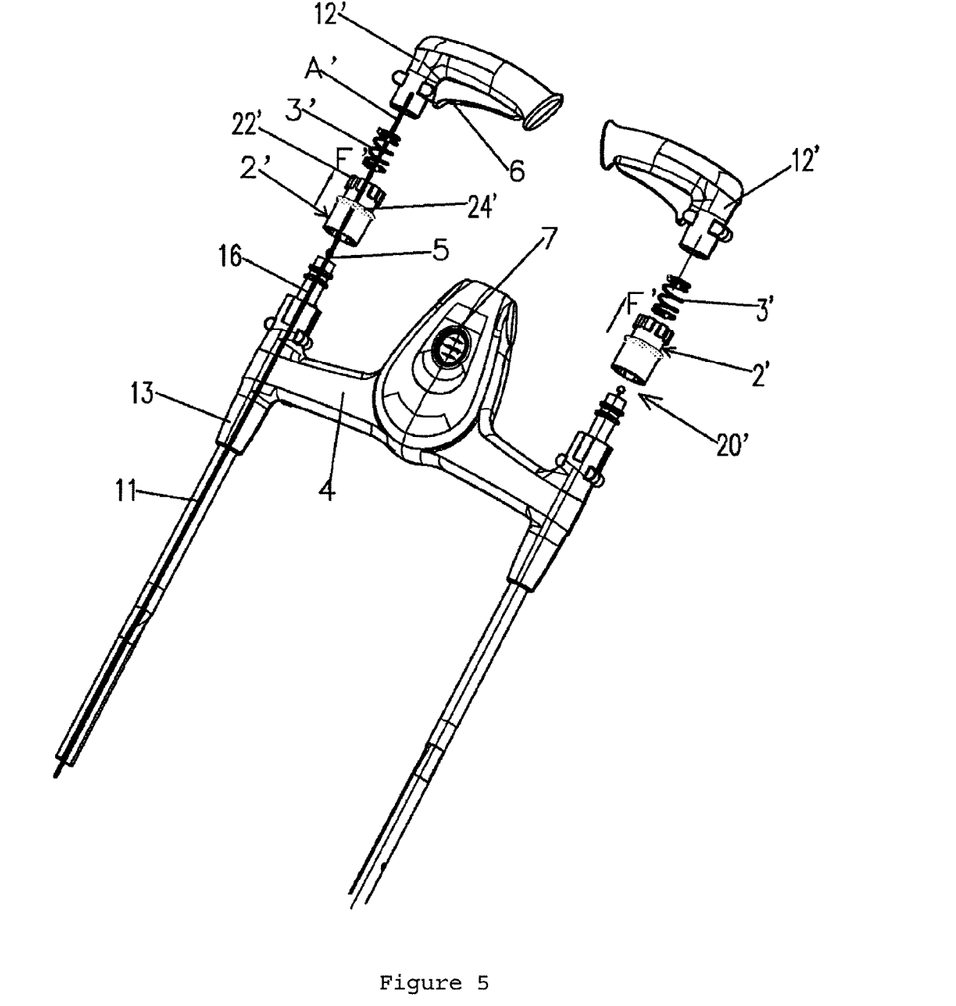
FIG. 5 is a three-dimensional exploded view of an operating control mechanism for a garden tool of a second preferred embodiment of the present invention.
Figure 6:
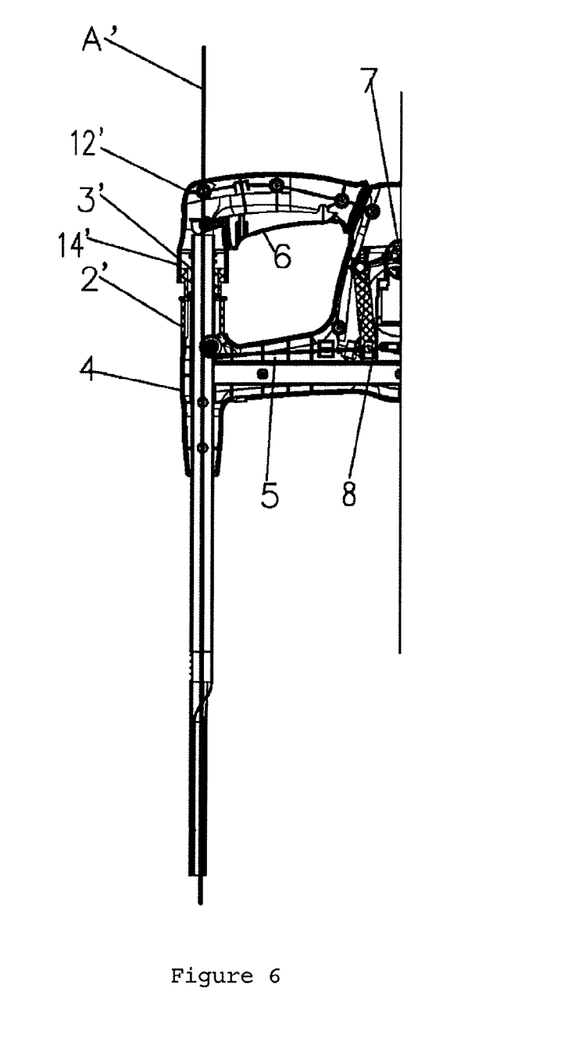
FIG. 6 is a partial sectional view of FIG. 5 in an assembled state.

Further referring to FIGS. 5 and 6, in embodiment II, the operating control mechanism 20' has a structure substantially similar to that of the operating control mechanism 20 in embodiment I, and thus identical structures are denoted with identical reference numbers and are not stated in detail, only different structures being explained and illustrated.

A stop component 2' in the present embodiment is provided with a first toothed part 22' and an operable part 24' on the outer surface thereof. An inner surface of each handle 12' is provided with a second toothed part 14' which is engagable with the first toothed part 22', and an elastic element 3' is sheathed on a positioning column 16 and arranged between the stop component 2' and the handle 12'. Pulling the operable part 24' upwards moves the stop component 2' upwards relative to the handle 12', as shown by the arrow F', so that the engagement between the first toothed part 22' and the second toothed part 14' is released and thus the handle 12' can rotate around the axis A' thereof in a range of 360 degrees.

Embodiment III

Further referring to FIGS. 7 and 8, again in embodiment III, the operating control mechanism 20" has a structure substantially similar to those of the operating control mechanisms 20, 20' in embodiments I and II, and thus identical structures are denoted with identical reference numbers and are not stated in detail, only different structures being explained and illustrated.

Figure 7:
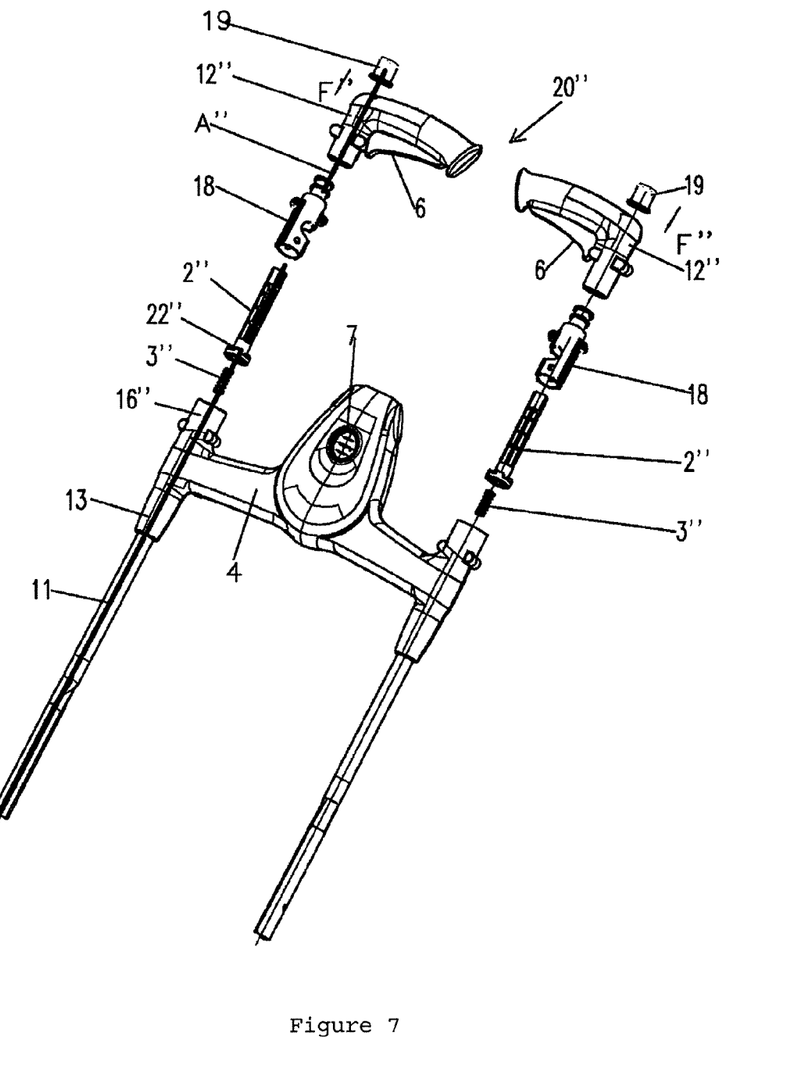
FIG. 7 is a three-dimensional exploded view of an operating control mechanism for a garden tool of a third preferred embodiment of the present invention.
Figure 8:
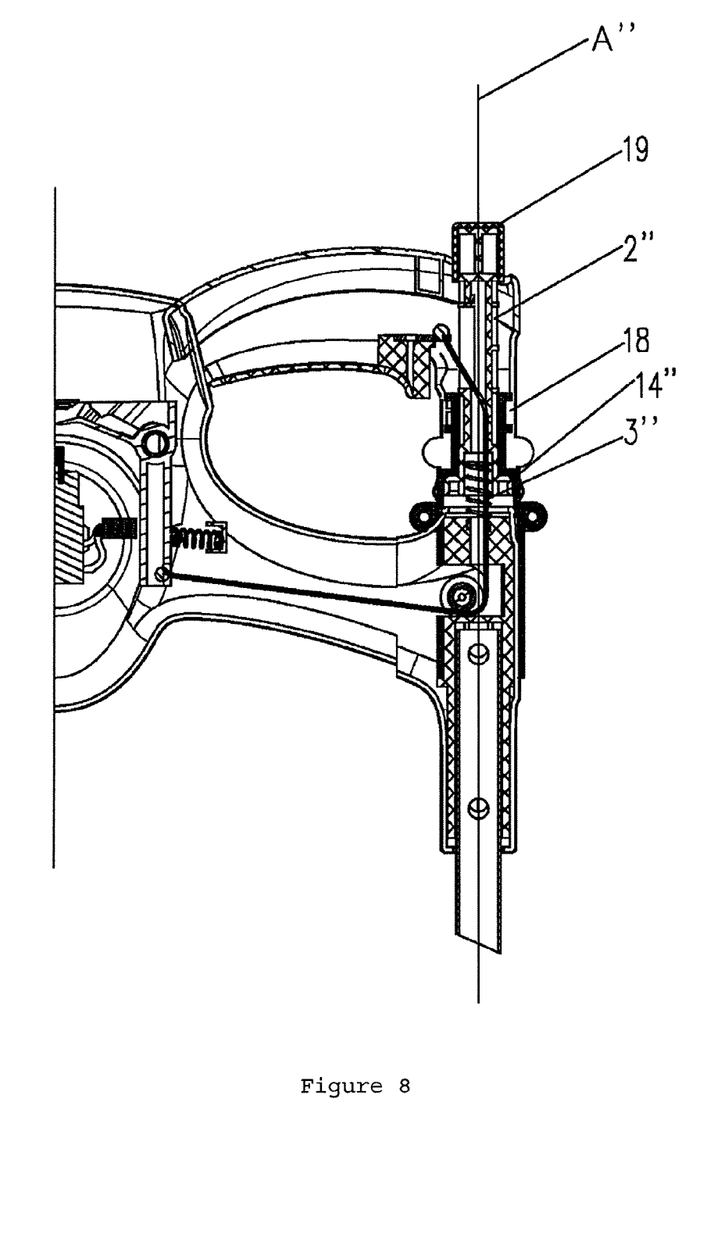
FIG. 8 is a partial sectional view of FIG. 7 in an assembled state.

The operating control mechanism 20" in the present embodiment comprises handles 12", stop components 2", casing tubes 18 which are sheathed on the stop components 2", elastic elements 3" and buttons 19. A lower end part of each of the stop components 2" is provided with a first toothed part 22", each of the casing tubes 18 is provided with a second toothed part 14", and the first toothed part 22" is engagable with the second toothed part 14". Each of the casing tubes 18 is arranged between the stop component 2" and the handle 12'. Each of the elastic elements 3" is arranged between the stop component 2" and the positioning column 16". The buttons 19 are mounted on the handles 12 and are engagable with the stop components 2". In this way, when a handle 12" needs to be rotated, a button 12" is pressed downwards as shown by the arrow F'" such that the engagement between the stop component 2" and the casing tube 18 is released and therefore the handle 12" can rotate around the axis A" thereof in a range of 360 degrees.

Embodiment IV

Figure 9:
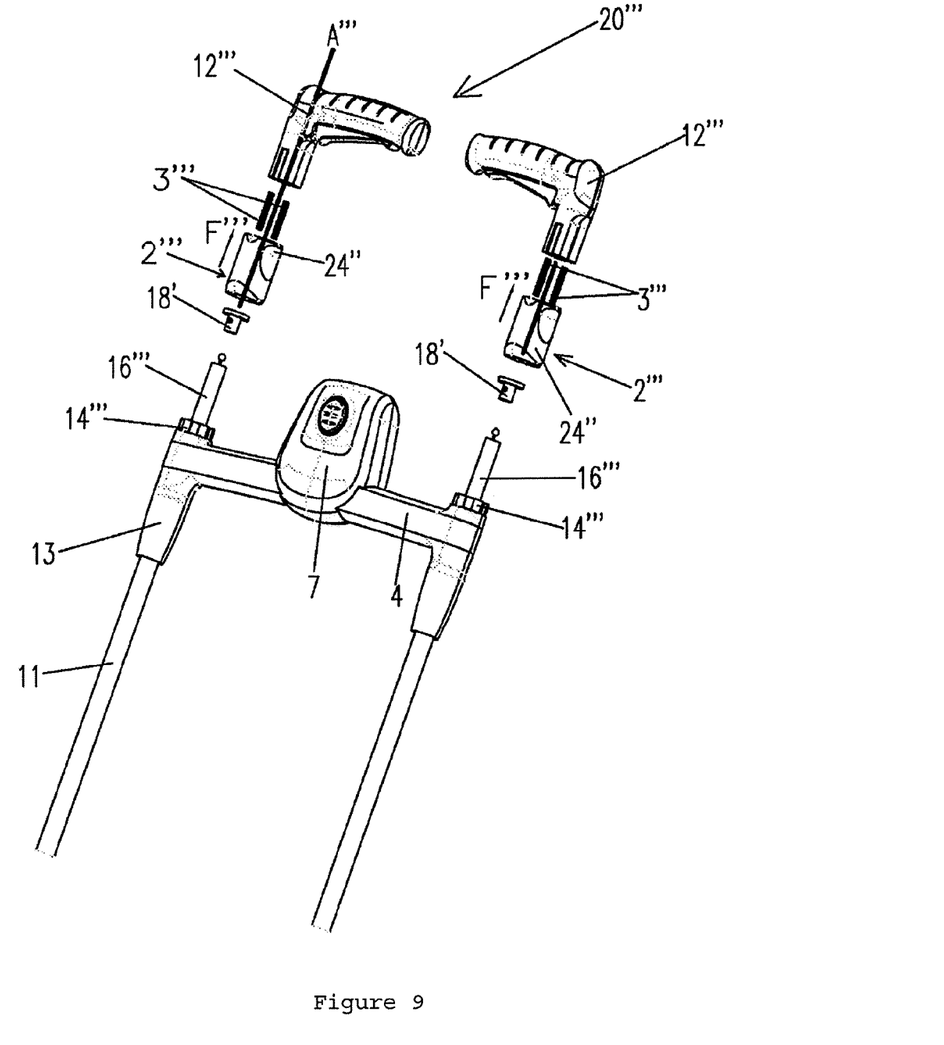
FIG. 9 is a three-dimensional exploded view of an operating control mechanism for a garden tool of a fourth preferred embodiment of the present invention.
Figure 10:
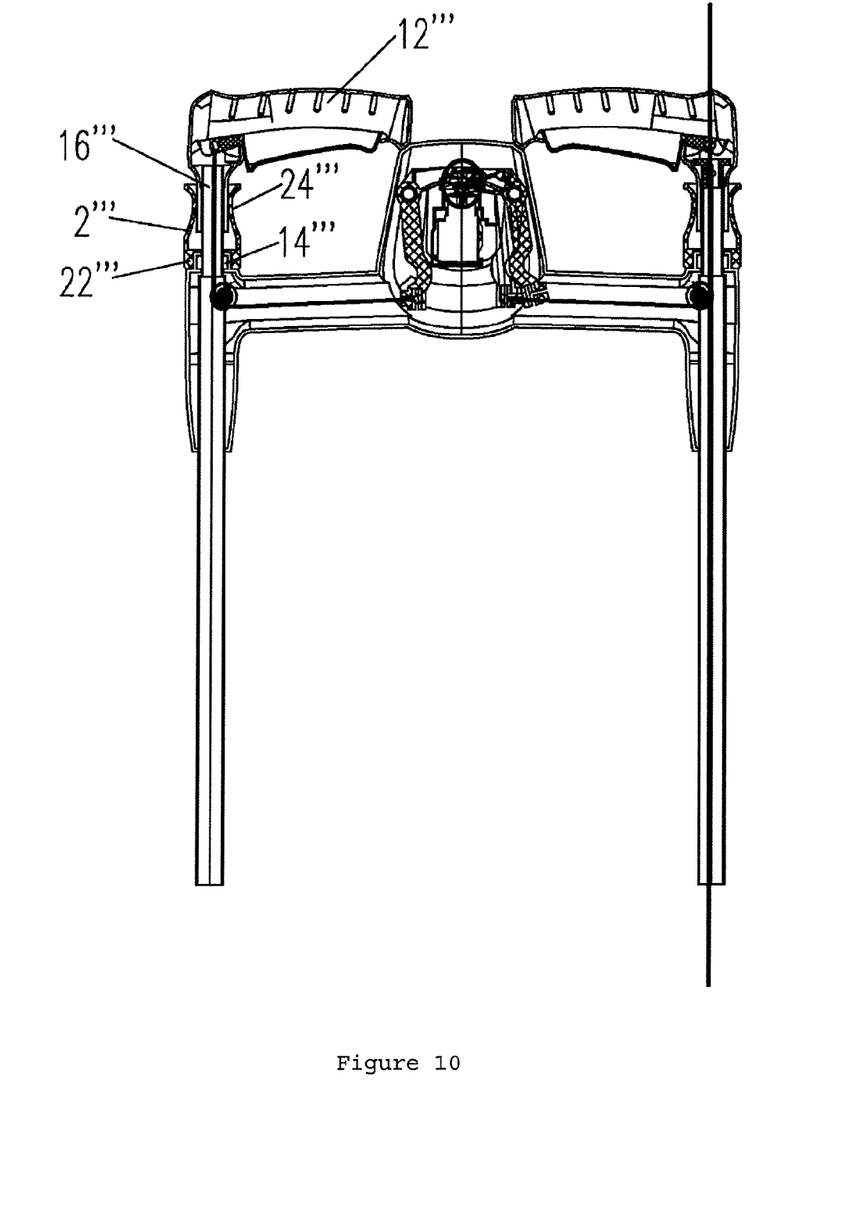
FIG. 10 is a sectional view of FIG. 9 in an assembled state.
Figure 11:
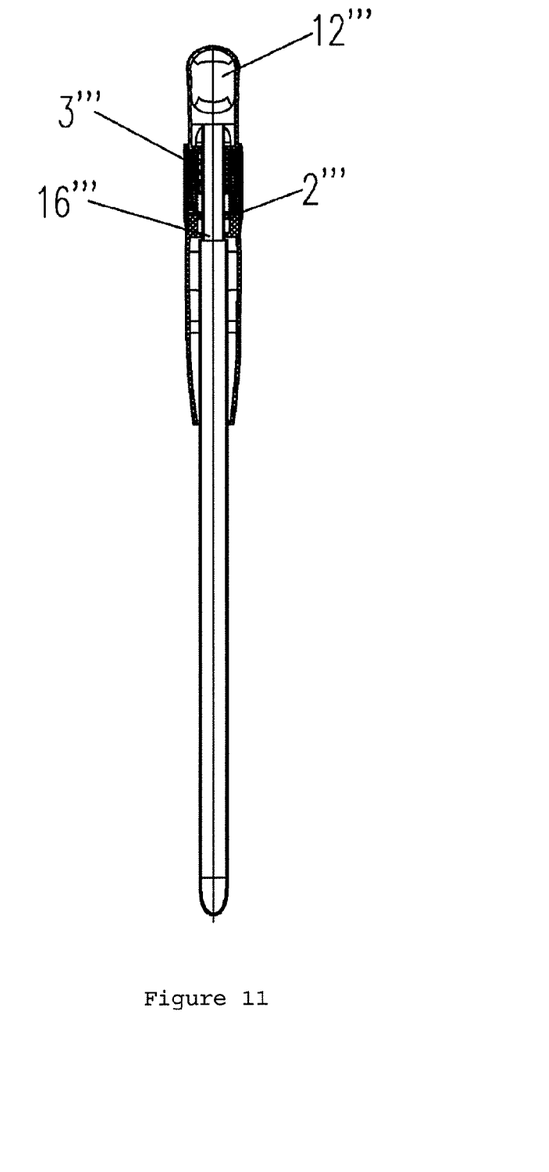
FIG. 11 is another sectional view of FIG. 9 in an assembled state.

Further referring to FIGS. 9 to 11, the operating control mechanism 20"" of the present embodiment has a structure substantially similar to those of the operating control mechanisms 20, 20', 20" in embodiments I, II and III, and thus identical structures are denoted with identical reference numbers and are not stated in detail, only different structures being explained and illustrated.

The operating control mechanism 20'" in the present embodiment comprises handles 12'", stop components 2'", a pair of elastic elements 3'" and casing tubes 18'. An outer surface of each of the stop components 2'" is also provided with an operable part 24" which is used for pulling the stop component 2'" upwards in the F'" direction, and the stop component is arranged between a handle 12'" and a positioning column 16'". An inner surface of each of the stop components 2'" is provided with a first toothed part 22'", and an outer surface of the bottom end of each positioning column 16'" is provided with a second toothed part 14'" which is engagable with the first toothed part 22'". The casing tubes 18' are sheathed on the positioning columns 16''' and are arranged inside the handles 12'''. The pair of elastic elements 3''' is arranged between the stop components 2''' and the handles 12'''. When a handle 12''' needs to be rotated, pulling the operable part 24''' upwards moves the stop component 2''' upwards relative to the handle 12''', as shown by the arrow F''', so that the engagement between the first toothed part 22''' and the second toothed part 14''' is released and thus the handle 12''' can rotate around the axis A''' thereof in a range of 360 degrees.

It should be noted that the preferred embodiments are only provided for illustrating the technical concept and characteristics of the present invention, for the purpose of enabling those skilled in the art to understand the content of the present invention and to implement the present invention, but not for limiting the scope of protection of the present invention. Any equivalent variation or modification of the spirit of the present invention shall be incorporated in the protective scope of the present invention.

The invention claimed is:

1. An operating control mechanism for a garden tool, comprising
    a control button to allow the garden tool to be activated; and
    a pair of handles located at two sides of the control button, with at least one of said pair of handles being provided with a trigger to activate the garden tool; wherein each handle is associate with a stop component which is movable along its longitudinal axis relative to the handle it is associated, and the handle rotatable with respect to the longitudinal axis of the stop component from a first orientation to a second orientation upon an axial movement of the stop component in a first direction and locked at the second orientation upon a further axial movement of the stop component in a second direction opposite the first direction.

2. The operating control mechanism for a garden tool as claimed in claim 1, characterized in that said stop components are movable upwards or downwards relative to said handles and are each provided with a first toothed part, said handles are each provided with a second toothed part, and said first toothed part is engagable with said second toothed part.

3. The operating control mechanism for a garden tool as claimed in claim 2, characterized in that said garden tool comprises a housing, said housing is provided with positioning columns, and said stop components are arranged between said positioning columns and said handles.

4. The operating control mechanism for a garden tool as claimed in claim 3, characterized in that the operating control mechanism further comprises elastic elements which are mounted on said positioning columns.

5. The operating control mechanism for a garden tool as claimed in claim 3, characterized in that the operating control mechanism further comprises elastic elements which are mounted between said handles and said stop components.

6. The operating control mechanism for a garden tool as claimed in claim 1, characterized in that the operating control mechanism further comprises casing tubes which are arranged between said stop components and said handles, said stop components are each provided with a first toothed part, said casing tubes are each provided with a second toothed part, and said first toothed part is engagable with said second toothed part.

7. The operating control mechanism for a garden tool as claimed in claim 6, characterized by further comprising buttons, which are mounted on said handles and are engagable with said stop components.

8. The operating control mechanism for a garden tool as claimed in claim 1, characterized in that said stop components are movable upwards or downwards relative to said handles and are each provided with a first toothed part, said garden tool comprises a housing which is provided with the positioning columns, positioning columns are each provided with a second toothed part, and said first toothed part is engagable with said second toothed part.

9. The operating control mechanism for a garden tool a claimed in claim 8, characterized in that the operating control mechanism further comprises elastic elements which are mounted between said handles and said stop components.

10. The operating control mechanism for a garden tool as claimed in claim 1, characterized in that said garden tool comprises a housing, and said pair of handles can form a closed area with said housing.

11. The operating control mechanism for a garden tool as claimed in claim 1, characterized in that said handles can rotate around the axes thereof in a range of 360 degrees.

12. The operating control mechanism for a garden tool as claimed in claim 10 characterized in that said pair of handles can respectively rotate around the axes.

13. The operating control mechanism for a garden tool as claimed in claim 1 characterized in that said garden tool is an electric lawn mower.

* * * * *